US011086693B2

(12) United States Patent
Carteri et al.

(10) Patent No.: US 11,086,693 B2
(45) Date of Patent: *Aug. 10, 2021

(54) ADAPTABLE PAGES, WIDGETS AND FEATURES BASED ON REAL TIME APPLICATION PERFORMANCE

(71) Applicant: International Business Machines Corporation, Armonk, NY (US)

(72) Inventors: Francesco Maria Carteri, Rome (IT); Fabio Cerri, Rome (IT); Marco De Santis, Tivoli (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,745

(22) Filed: Feb. 6, 2020

(65) Prior Publication Data

US 2020/0174853 A1 Jun. 4, 2020

Related U.S. Application Data

(63) Continuation of application No. 15/978,698, filed on May 14, 2018, now Pat. No. 10,572,316.

(51) Int. Cl.
*G06F 11/22* (2006.01)
*G06F 9/54* (2006.01)
(Continued)

(52) U.S. Cl.
CPC .............. *G06F 9/541* (2013.01); *G06F 9/451* (2018.02); *G06F 9/5011* (2013.01); *G06F 9/547* (2013.01);
(Continued)

(58) Field of Classification Search
CPC ........ G06F 9/541; G06F 9/451; G06F 9/5011; G06F 9/547; G06F 11/302; G06F 11/3409
See application file for complete search history.

(56) References Cited

U.S. PATENT DOCUMENTS 6,963,828 B1 * 11/2005 McDonald ............ G06F 9/5061
703/1
8,775,332 B1 7/2014 Morris et al.
(Continued)

FOREIGN PATENT DOCUMENTS

WO 2012100619 A1 8/2012
WO 2017156435 A1 9/2017

OTHER PUBLICATIONS

Jiayin Li et al "Online optimization for scheduling preemptable tasks on IaaS cloud systems", (Year: 2012).*
(Continued)

*Primary Examiner* — Doon Y Chow
*Assistant Examiner* — Abdou K Seye
(74) *Attorney, Agent, or Firm* — Scully, Scott, Murphy & Presser, P.C.; Alexander Jochym

(57) ABSTRACT

The system, method, and computer program product described herein provide ways to modify a user interface when a performance of the user interface degrades due to lack of resources including presenting the user interface to a user that includes a first element that requires an allocation of a first amount of resources of a server to perform a function, determining that a performance of the user interface has degraded below a threshold amount, in response to determining that the performance has degraded, identifying a second element that requires an allocation of a second amount of resources of the server to perform the function where the second amount of resources is smaller than the first amount of resources, and replacing the first element
(Continued)

with the second element to reduce the required amount of resources that are allocated by the server to the user interface.

20 Claims, 7 Drawing Sheets

(51) Int. Cl.
 G06F 9/451 (2018.01)
 G06F 11/30 (2006.01)
 G06F 9/50 (2006.01)
 G06F 11/34 (2006.01)
(52) U.S. Cl.
 CPC ........ *G06F 11/302* (2013.01); *G06F 11/3409* (2013.01)

(56) References Cited

U.S. PATENT DOCUMENTS

| | | | |
|---|---|---|---|
| 9,152,529 | B2 | 10/2015 | George et al. |
| 2006/0107219 | A1 | 5/2006 | Ahya et al. |
| 2007/0300185 | A1 | 12/2007 | MacBeth et al. |
| 2008/0307043 | A1 | 12/2008 | Dorsey et al. |
| 2009/0122706 | A1* | 5/2009 | Alfano ................ H04L 41/5003 370/237 |
| 2009/0319462 | A1 | 12/2009 | Tirpak et al. |
| 2012/0137235 | A1 | 5/2012 | T S et al. |
| 2012/0233312 | A1 | 9/2012 | Ramakumar et al. |
| 2014/0279761 | A1* | 9/2014 | Aliferis ................... G06F 16/93 706/12 |
| 2014/0359472 | A1 | 12/2014 | Lefor |
| 2016/0170567 | A1 | 6/2016 | Hunter et al. |
| 2016/0210721 | A1* | 7/2016 | Taylor ...................... G06T 1/20 |
| 2016/0259501 | A1 | 9/2016 | Nagarajan et al. |
| 2016/0366036 | A1* | 12/2016 | Gupta ..................... H04L 67/16 |
| 2018/0004823 | A1 | 1/2018 | Kakhandiki et al. |
| 2018/0046410 | A1 | 2/2018 | Boss et al. |
| 2018/0046510 | A1* | 2/2018 | Boss ................... G06F 11/3024 |
| 2018/0047052 | A1 | 2/2018 | Owens et al. |
| 2018/0047062 | A1 | 2/2018 | Kang et al. |
| 2019/0347143 | A1 | 11/2019 | Carteri et al. |

OTHER PUBLICATIONS

Findlater, L., "Supporting Feature Awareness and Improving Performance with Personalized Graphical User Interfaces", Thesis Paper, http://faculty.washington.edu/leahkf/pubs/findlater-phd-thesis.pdf, Jul. 2009, Accessed on May 7, 2018, 189 pages.

Mitrovic, N., et al., "Performance Analysis of an Adaptive User Interface System Based on Mobile Agents", http://citeseerx.ist.psu.edu/viewdoc/download?doi=10.1.1.76.7059&rep=rep1&type=pdf, Accessed on May 7, 2018, 18 pages.

List of IBM Patents or Patent Applications Treated as Related.

* cited by examiner

ADAPTABLE PAGES, WIDGETS AND FEATURES BASED ON REAL TIME APPLICATION PERFORMANCE

BACKGROUND

The present disclosure relates to systems and methods used to reduce performance degradation of a system for a user.

Information Technology (IT) activity today is often executed through web user interfaces. When the workload increases or the user load increases the web interface may become unresponsive or performance of the web interface may decrease because the system cannot afford the unpredicted load. These performance reductions may impact the ability of the web interface to perform the tasks required by users. Often, when experiencing a larger than expected load or other similar situation, a web server may throttle or reduce the resources assigned to some or all of the current web interfaces in an attempt to provide them with some basic level of service.

As an example, the streaming quality of a video or other media that is presented by a web interface may be reduced in an attempt to conserve resources or when network speed becomes poor. For example, the quality of the video or other media may be reduced from high definition (HD) to standard definition (SD) or less if the network speed is reduced. As another example, the resources, bandwidth, processing power, etc., allocated to a web interface executing a process on the server may be reduced in an attempt to lighten the load on the system. However, each of these reductions targets the particular task that is actively being performed by the web interface, thereby reducing or even removing the ability of the web interface to accomplish this task.

When the application or process being performed by the web interface can be clustered, an IT administrator may cluster the system in an attempt to scale up the available resources to match the number of concurrent users and the workload. Even when clustering, when the total number of users or workloads exceeds a threshold amount, the system may once again experience reduced response times or in the worst case fail to respond at all. While clustering may provide a solution to an increase in user load or work load, for example, by adding additional resources, clustering does not reduce the load on the system at the current resource level.

BRIEF SUMMARY

The system, method, and computer program product described herein provide for the modification of a user interface when performance of the user interface degrades.

In an aspect of the present disclosure, a method implemented by at least one hardware processor is disclosed including presenting a user interface to a user that includes a first element that requires an allocation of a first amount of resources of a server to perform a function, receiving performance data associated with the user interface, determining based on the received performance data that a performance of the user interface has degraded below a threshold amount, in response to determining that the performance of the user interface has degraded below the threshold amount, identifying a second element that requires an allocation of a second amount of resources of the server to perform the function where the second amount of resources is smaller than the first amount of resources, and replacing the first element with the second element to reduce the required amount of resources that are allocated by the server to the user interface.

This manner of modifying the user interface provides unique advantages over prior methods dealing with degradation of performance by reducing the resources required for the user interface to perform its functions. This may be especially effective in situations where the resources that a server may allocate to the user interface may not be scaled or increased.

In some aspects, identifying the second element may include determining a performance weight of the first element based on the performance data, determining a performance weight of the second element based on the performance data, and determining that the performance weight of the second element is less than the performance weight of the first element.

Using performance weight to identify the second element provides an advantage in that the modification of the user interface may be directly tied to reducing performance requirements of the user interface.

In some aspects, the first element may include a plurality of implementations. Each implementation may require a different allocation of resources of the server to perform the function. The second element may be one implementation of the plurality of implementations of the first element.

The use of user interface elements having multiple implementations allows the resource usage of the user interface to be scaled as needed by maintaining the core functionality of an element of the user interface while removing unnecessary or additional functionality when performance degradation of the user interface is detected.

In some aspects, the method may further include in response to determining that the user interface has degraded below the threshold amount, determining that a third element of the user interface is not relevant to performance of the function and disabling the third element to reduce the required amount of resources that are allocated by the server to the user interface.

Disabling elements of the user interface that are not relevant to the function being performed by the user provides the advantage of reducing the resource requirements of the user interface without removing functionality that the user is actively using.

In some aspects, a computer readable storage medium is disclosed including instructions that, when executed by at least one processor including hardware, configures the at least one hardware processor to present a user interface to a user that includes a first element that requires an allocation of a first amount of resources of a server to perform a function, receive performance data associated with the user interface, determine based on the received performance data that a performance of the user interface has degraded below a threshold amount, in response to determining that the performance of the user interface has degraded below a threshold amount, identify a second element that requires an allocation of a second amount of resources of the server to perform the function where the second amount of resources is smaller than the first amount of resources, and replacing the first element with the second element to reduce the required amount of resources that are allocated by the server to the user interface.

This manner of modifying the user interface provides unique advantages over prior methods dealing with degradation of performance by reducing the resources required for the user interface to perform its functions. This may be especially effective in situations where the resources that a server may allocate to the user interface may not be scaled or increased.

In some aspects, a system including at least one processor including hardware is disclosed. The at least one processor is configured to present a user interface to a user that includes a first element that requires an allocation of a first amount of resources of a server to perform a function, receive performance data associated with the user interface, determine based on the received performance data that a performance of the user interface has degraded below a threshold amount, in response to determining that the performance of the user interface has degraded below a threshold amount, identify a second element that requires an allocation of a second amount of resources of the server to perform the function where the second amount of resources is smaller than the first amount of resources, and replace the first element with the second element to reduce the required amount of resources that are allocated by the server to the user interface.

This manner of modifying the user interface provides unique advantages over prior methods dealing with degradation of performance by reducing the resources required for the user interface to perform its functions. This may be especially effective in situations where the resources that a server may allocate to the user interface may not be scaled or increased.

A method implemented by at least one hardware processor is disclosed including presenting a user interface to a user that includes a first plurality of elements usable together by a user to perform a task where performance of the task requires an allocation of a first amount of resources of a server corresponding to the resources of the server required by the first plurality of elements to perform the task, receiving performance data associated with the user interface, determining based on the received performance data that a performance of the user interface has degraded below a threshold amount, in response to determining that the performance of the user interface has degraded below a threshold amount, determining a goal of the task, identifying an equivalent task that has the same goal as the task where performance of the equivalent task requires an allocation of a second amount of resources of the server that corresponds to the resources of the server required by a second plurality of elements to perform the equivalent task where the second amount of resources is different than the first amount of resources, and replacing the task with the equivalent task to reduce the required amount of resources that are allocated by the server to the user interface.

This manner of modifying the user interface provides unique advantages over prior methods dealing with degradation of performance by replacing a task with an equivalent task that has a reduced resource requirement for the user interface to achieve a particular goal. This may be especially effective in situations where the resources that a server may allocate to the user interface may not be scaled or increased.

In some aspects, the method may further include receiving additional performance data associated with the user interface after the modification of the user interface, determining based on the received additional performance data that the performance of the user interface is still degraded below the threshold amount, and in response to determining that the performance of the user interface is still degraded below the threshold amount, identifying a first element of the second plurality of elements that requires an allocation of a third amount of resources of the server to perform a function of the equivalent task, identifying an second element that requires an allocation of a fourth amount of resources of the server to perform the function of the equivalent task where the fourth amount of resources being smaller than a third amount of resources, and replacing the first element of the second plurality of elements with the second element to reduce the required amount of resources that are allocated by the server to the user interface to perform the equivalent task.

By further modifying the user interface at the element level if a modification at the task level does not solve a performance degradation, further advantages in reduction of required resources of the user interface may be achieved.

In some aspects, a computer readable storage medium is disclosed that includes instructions that, when executed by at least one processor including hardware, configures the at least one processor to present a user interface to a user including a first plurality of elements that are usable together by a user to perform a task where performance of the task requires an allocation of a first amount of resources of a server and the first amount of resources corresponds to the resources of the server required by the first plurality of elements to perform the task, receive performance data associated with the user interface, determine based on the received performance data that a performance of the user interface has degraded below a threshold amount, and in response to determining that the performance of the user interface has degraded below a threshold amount, determine a goal of the task, identify an equivalent task that has the same goal as the task where performance of the equivalent task requires an allocation of a second amount of resources of the server that corresponds to the resources of the server required by a second plurality of elements to perform the equivalent task where the second amount of resources being different than the first amount of resources, and replace the task with the equivalent task to reduce the required amount of resources that are allocated by the server to the user interface.

This manner of modifying of the user interface provides unique advantages over prior methods dealing with degradation of performance by replacing a task with an equivalent task that has a reduced resource requirement for the user interface to achieve a particular goal. This may be especially effective in situations where the resources that a server may allocate to the user interface may not be scaled or increased.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

The aspects disclosed herein provide solutions to the decreased performance or unavailability of a system that serves a user interface that may be caused by increased user load, work load, connectivity, or other similar issues, without requiring the allocation of additional resources to expand the cluster or support a particular task. In an example, the user interface may be dynamically adapted or modified when the performance decreases to reduce the required amount of resources necessary for the user interface to perform a task. For example, a task or widget of the user interface may be adapted or modified to consume fewer resources.

Figure 1:
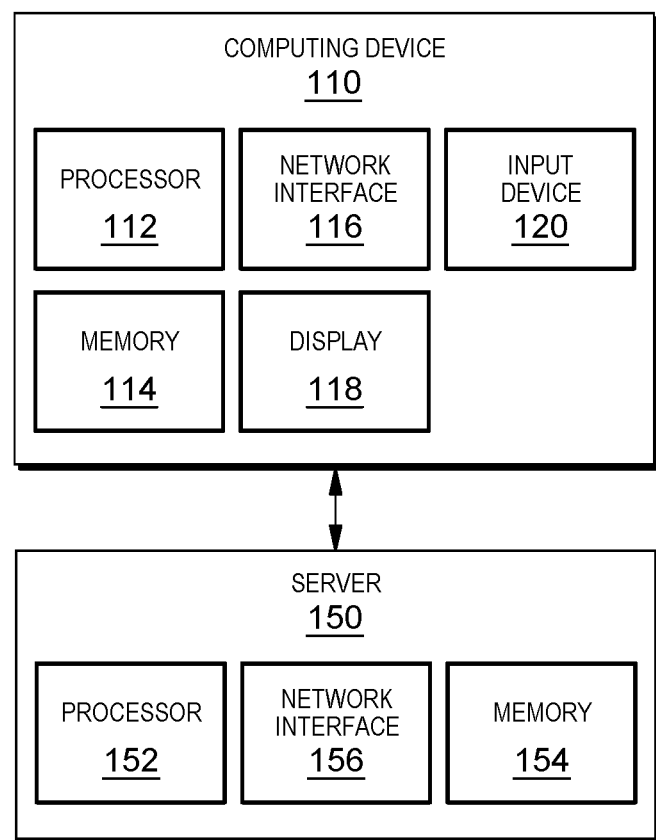
FIG. 1 is a system diagram illustrating a system for modifying a user interface in accordance with some aspects of the present disclosure.

With reference now to FIG. 1, a system 100 is illustrated. In some aspects, system 100 includes a computing device 110, and a server 150.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to present the user with a browser including a user interface for interacting with server 150. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a server 150 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from server 150.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120. Display 118 may be configured to present a user interface to the user.

Input device 120 may include, for example, a keyboard, a mouse, a touch-sensitive display 118, a keypad, a microphone, or other similar input devices or any other input devices that may be used alone or together to provide a user with the capability to interact with computing device 110.

Server 150 includes a processor 152, memory 154, and a network interface 156 that may include similar functionality as processor 112, memory 114, and network interface 116. In some aspects, server 150 may, for example, be any computing device, server, or similar system that is configured to interact with or provide data to computing device 110. In some aspects, server 150 is a web server that may be accessed by computing device 110 over a communications/data network to perform a variety of tasks. For example, server 150 may allocate resources to each computing device 110 to perform a task requested by that computing device 110. Some example tasks may include streaming media for presentation to a user of computing device 110 via display 118, performing processing of files or other data according to instructions from computing device 110, or other similar tasks performed by server or web servers. In some aspects, server 150 may be a cloud/enterprise system including a server or array of servers that are configured to perform tasks associated with a user interface.

Figure 2:
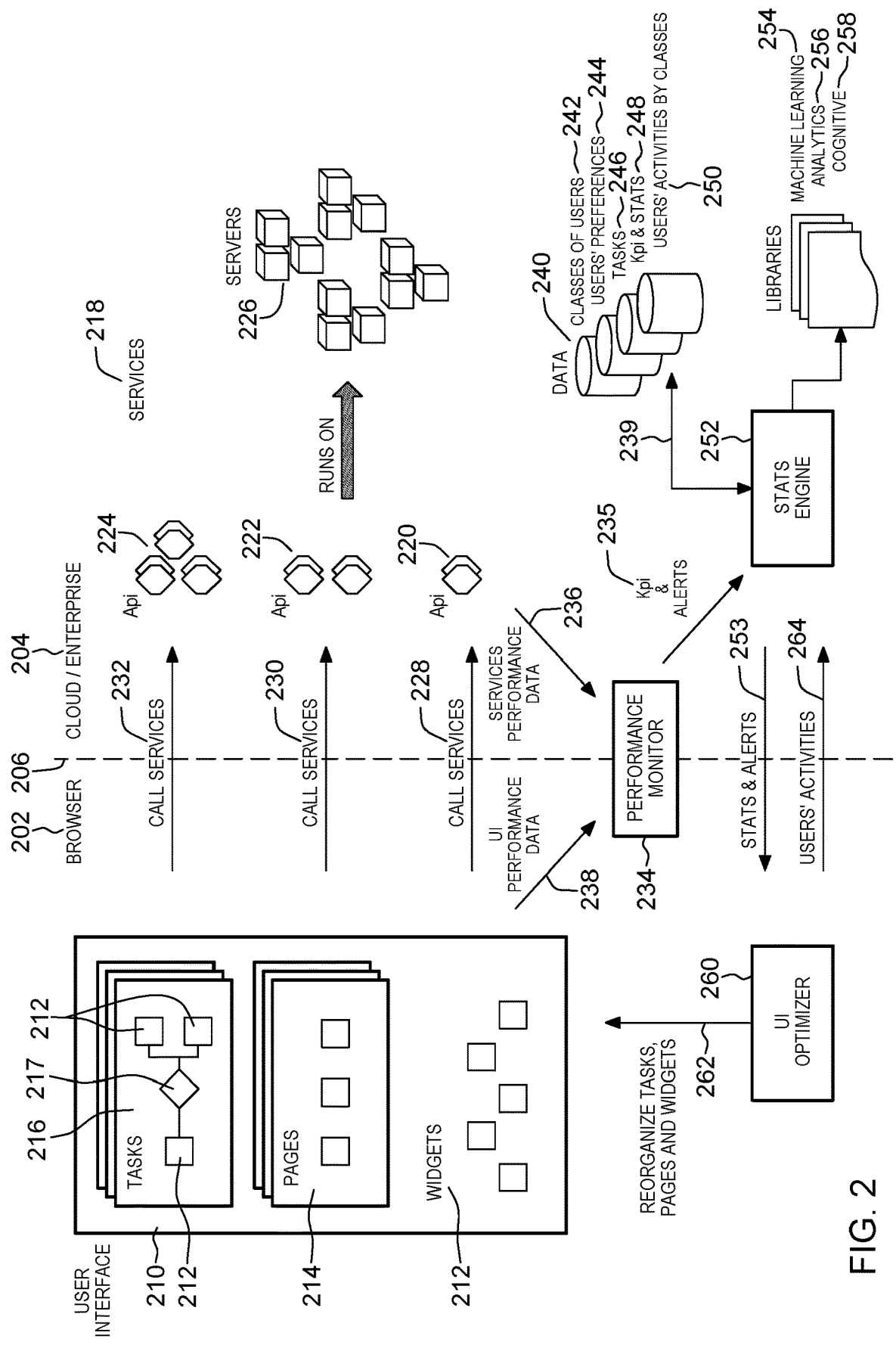
FIG. 2 is a system architecture in accordance with some aspects of the present disclosure.

With reference now to FIG. 2, an example system architecture 200 that may be implemented by system 100 is illustrated. System architecture 200 illustrates the interactions between components that are performed or implemented by a browser 202 and components that are performed or implemented by a cloud/enterprise 204. In some aspects, browser 202 may be implemented or executed by computing device 110 (FIG. 1). For example, computing device 110 (FIG. 1) may include instructions stored in memory 114 (FIG. 1) that are configured to implement the components of browser 202. In some aspects, cloud/enterprise 204 may be implemented or executed by server 150 (FIG. 1), a web server, an array of servers, a distributed server network, or other similar systems that are configured to provide services or allocate resources to one or more browsers 202. For example server 150 (FIG. 1) may include instructions stored in memory 154 (FIG. 1) that are configured to implement the components of cloud/enterprise 204. In some aspects, cloud/enterprise 204 may also or alternatively be implemented or executed by one or more computing devices 110. Browser 202 may communicate with cloud/enterprise 204, for example, via a wired or wireless network, the internet, or other similar methods. For example, a browser 202 implemented by computing device 110 may communicate with cloud/enterprise 202 implemented by one or more server 150 using network interfaces 116 and 156.

While each component is illustrated as being performed or implemented by one of browser 202 and cloud/enterprise 204, for example, as separated by a dashed line 206, it is contemplated that features found on the side of browser 202 may be performed by cloud/enterprise 204 and that features found on the side of cloud/enterprise 204 may be performed by browser 202. For example, in some aspects, a statistics (stats) engine 252 of system architecture 200 may be performed by browser 202. In some aspects, a user interface (UI) optimizer 260 of system architecture 200 may be performed by cloud/enterprise 204.

Figure 3:
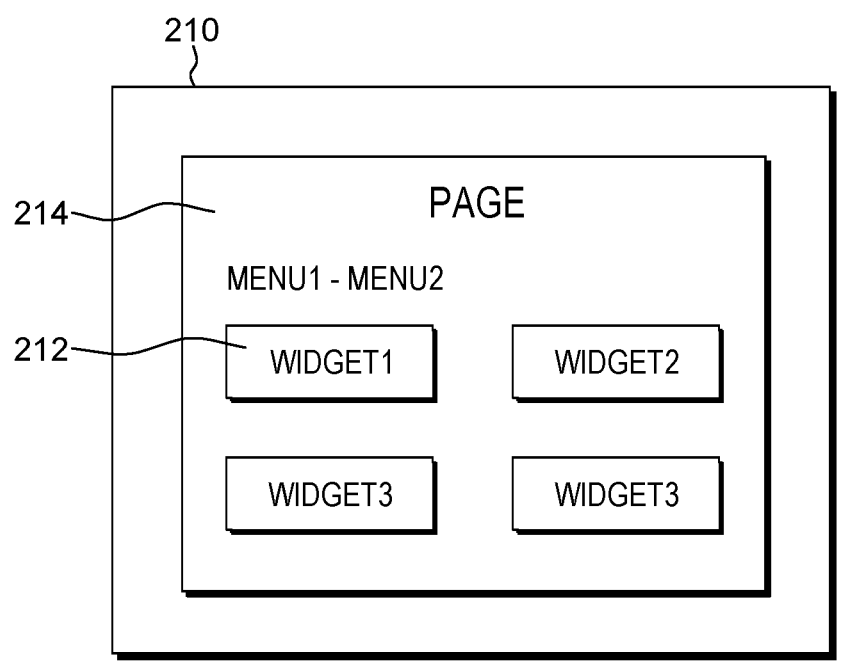
FIG. 3 is an example user interface in accordance with some aspects of the present disclosure.

With continued reference to FIGS. 2 and 3, browser 202 may include one or more user interfaces 210 that are configured to present information or other data to a user of computing device 110 (FIG. 1), e.g., via display 118 (FIG. 1), and to receive inputs from a user to access services of the cloud/enterprise 204, e.g., via input device 120 (FIG. 1). Modern user interfaces are often an assembly of visual elements called widgets 212. A widget 212 may include, for example, a visual element in the user interface that may be accessed by a user, e.g., via input device 120, to perform a function, that may present data or other information to a user without requiring a specific activation by the user, or other similar visual elements. While visual elements of a UI are described herein as widgets, any other kinds of visual elements may be used. The implementation or execution of a widget 212 typically relies on one or more API calls to cloud/enterprise 204.

A user of the user interface may navigate through pages 214 of the user interface that include organized groups of collaborating widgets 212. For example, each page 214 may include a number of widgets 212. In some aspects, the same widget 212 may be found on multiple pages 214. In some aspects, a widget 212 from one page 214 may be associated with or related to a widget 212 on another page 214. In some aspects, the activation of a widget 212 may cause a new page 214 to be displayed in the user interface.

A user may accomplish a task 216 by navigating and interacting with one or more widgets 212 or pages 214 in the user interface 210. A task 216 may be represented as a sequence of steps that are executed by the user in the user interface 210. For example, a task 216 may include a list of ordered widgets 212 that the user has activated or interacted with on various pages 214 in the user interface 210. For example, as illustrated in FIG. 2, each task 216 may be represented as a flow path through a series of interconnected widgets 212 that show a sequence of how those widgets 212 are used, and what decisions 217 are made between the widgets 212, to achieve a particular goal.

In some aspects, the user interface 210 may be built on top of application programming interfaces (APIs) implemented by software running on cloud/enterprise 204. Cloud/enterprise 204 includes services 218, for example, APIs 220, 222, and 224 or other similar services that may run on or be executed by one or more servers 226 of cloud/enterprise 204. Servers 226 may, for example, include any number of computing devices or servers included in or associated with cloud/enterprise 204 that are configured to execute APIs or perform other tasks. In some aspects, for example, servers 226 may be virtual or physical servers. While illustrated with a discrete number of APIs or servers, any number of APIs or servers may be implemented or executed by cloud/enterprise 204.

In some aspects, the activation of a widget 212 may cause browser 202 to transmit a service call 228 to cloud/enterprise 204 that causes cloud/enterprise 204 to execute an API 220 on one of servers 226.

In some aspects, the activation of a page 214 may cause browser 202 to transmit one or more service calls 230 to cloud/enterprise 204 that cause cloud/enterprise 204 to execute one or more APIs 222 on one or more of servers 226. For example, since pages 214 include widgets 212, the activation of a page 214 may also include the activation of one or more widgets 212. The service call 230 may include calls to one or more APIs 222 depending on which widgets 212 or other parts of the page 214 have been activated.

In some aspects, the performance of a task 216 by a user may cause browser 202 to transmit one or more service calls 232 to cloud/enterprise 204 that cause cloud/enterprise 204 to execute one or more APIs 224 on one or more of servers 226. For example, since a task 216 may include the use of multiple widgets 212 and pages 214, the performance of a task 214 may also include the activation of one or more widgets 212 and pages 214 and their corresponding APIs.

In this manner, the resources of servers 226 may be allocated to the browser 202 by cloud/enterprise 204 based on the service calls 228, 230, and 232, and the corresponding executed APIs 220, 222, 224.

The activity of the browser 202 and cloud/enterprise 204 may also be tracked, for example, by a performance monitor 234. In some aspects, performance monitor may be implemented by browser 202, cloud/enterprise 204, or a combination of browser 202 and cloud/enterprise 204. In some aspects, performance monitor 234 may be implemented or executed separately from both browser 202 and cloud/enterprise 204, e.g., on another computing device 110 or server 150.

Performance monitor 234 and may collect or receive data from both browser 202 and cloud/enterprise 204. For example, performance monitor 234 may collect or receive service performance data 236 from cloud/enterprise 204 and may collect or receive user interface performance data 238 from browser 202.

Modern server architectures often include a large set of mature tools to measure the performance of APIs and user interfaces. Performance monitor 234 may be a standard tool that continuously or periodically monitors a performance status of the services 218 and user interface 210 based on the received data 236, 238. Non-limiting examples of such a performance monitoring tool may include Dynatrace® sold by Dynatrace LLC, IBM Rational Performance Tester™ produced by International Business Machines Corporation (IBM), and Nmon, a linux open source tool. Any other performance monitoring tool may be used.

In some aspects, performance monitor 234 may be configured to monitor and track real time performance trends of APIs, for example, by measuring performance times or resource allocations of API calls and monitoring the details of software and hardware behavior. For example, for each user scenario, metrics such as, e.g., response time, number of transactions, CPU consumption or other similar metrics may be collected. Performance monitor 234 may also be configured to measure the performance behavior of the user interface and of each visual element included in the user interface. For example, performance monitor 234 may collect all the performance data about visual element of the user interface including response times for each visual element during the execution of a task that is being accomplished by the user.

In some aspects, performance monitor 234 may generate alerts and key performance indicators (kpi) based on the monitoring. For example, an alert may be generated when a performance value of either the user interface 210 or services 218 degrades or falls below a pre-determined threshold, is degrading or decreasing faster than a pre-determined rate, or other similar measures of performance degradation. For example, if a key performance indicator element such as, e.g., response time associated with a specific UI operation step, falls below the pre-determine threshold an alert may be generated. Some non-limiting examples of key performance indicators may include CPU and memory consumption, response time, network data, and other similar indicators of the performance of a component of a user interface or network.

In some aspects, cloud/enterprise 204 may include a database 240 that stores data about classes of users 242, user preferences 244, tasks 246, kpi and statistics 248, user activities by class 250, patterns of user activity, or other similar data. In some aspects, database 240 may include features similar to computing device 110 or server 150. For example, database 240 may include processors, memory, network interfaces, or other similar features commonly found in a database. In some aspects, database 240 may include multiple databases 240, e.g., one for each type of data or a grouping of types of data.

User Interface Tasks

In some aspects, for example, a UI user Task[n] 246 stored in database 240 or received as part of the UI performance data 238 may be represented as an ordered sequence of widgets W[an] according to equation (1) below where [a1], [a2], . . . [an] each represent a particular widget:

$$\text{Task}[n] = \{W[a1], W[a2], \ldots W[an]\} \quad (1)$$

A user may navigate through the UI in different ways to accomplish the same goal. For example, there may be different UI tasks that share the same goal SGTasks[m]. Equivalent tasks may therefore be grouped by user goals, for example, as shown in equation (2) below wherein [b1], [b2], . . . [bn] each represent a particular task:

$$SG\text{Tasks}[m] = \{\text{Task}[b1], \text{Task}[b2], \ldots \text{Task}[bn]\} \quad (2)$$

This grouping by goal may also be stored in database 240.

User Preferences and Classes of Users

Users may be profiled in many ways using modern cognitive and profiling tools. For example, users may be classified by user role in the context of the service that they access, personality, behaviour and usage patterns in the context of the services that they access, or other similar classifications. Example user roles may include, e.g., Administrator, Operator, Viewer, or other similar roles that a user may be performing on the system through a UI. In some aspects, the user roles may be deduced based on the activities of the users. For example, a user performing tasks that only system administrators may perform may be classified as an administrator, a user who only views data using the UI may be classified as a viewer, etc.

In some aspects, the classes of users and roles may be used to group active UI users together and classify the tasks that they access. The classification data may be used to make UI performance modification decisions for tasks that are linked to the class of users that is related to the current logged in user. The classification data may, for example, be stored as classes of users 242 in database 240.

User preferences 244 may include specific parameters for a user that are not included in the classification data of the classes of users 242. For example, while a class of users 242 may achieve the same goal by performing one or more of a variety of different tasks 246, as described above, a particular user may require a specific sequence of steps or tasks or a greater level of task usage to achieve the same goal that may not be replaced with one of the equivalent tasks that is available in the class of users 242 to reach the same goal (e.g., SGTasks[m]). The user's specific requirements for using tasks or widgets may be stored as requirement data in the user preferences 244 for that user.

In some aspects, a ranking table may be built that profiles how users work with the UI 210. For example, each widget of the UI may be assigned a weight cost based on the role, profile, and patterns of each user as illustrated in Table 1 below:

TABLE 1

| UI Element | User Role | User Profile | User Pattern | Weight Cost |
|---|---|---|---|---|
| Elem1 | Admin | Demanding | Activity1 | 0.5 |
| Elem1 | Operator | Regular | Activity2 | 0.3 |
| . . . | | | | |
| Elem1 | Viewer | | | 0.1 |

For example, as seen in Table 1, UI element 1, e.g., a widget, may have a different weight cost depending on the role of the user, the user's profile, and the activity pattern. For example, widget Elem1 may have a weight cost of 0.5 when used by a user with the role of Admin, user profile value of demanding, and user pattern of activity1. As another example, widget Elem1 may have a weight cost of 0.3 when used by a user with the role of Operator, user profile value of regular, and user patter of activity2. As another example, widget Elem1 may have a weight cost of 0.1 when used by a user with a role of Viewer but with no user profile or user pattern data. In some aspects, the weight cost may be used to determine an overall weight for a widget. In some aspects, the ranking table may be built by a performance analyst or other similar individual that is familiar with the application and knows the scenarios and roles of various users and may be input into the system. In some aspects, the ranking table may be generated automatically, for example, based on established roles of users within the system. For example, user's may be assigned roles by an IT administrator or other entity which may be used to build the ranking table, e.g., by assigning pre-defined weights for each widget for each role and each activity.

Each class of users 242 may also be associated with a list of tasks 246, ClassTasks[m], that describe the preferred UI interactions and scenarios to meet a goal, for example, as illustrated in equation (3) below:

$$\text{ClassTasks}[m] = \{\text{Task}[b1], \text{Task}[b2], \ldots \text{Task}[bn]\} \quad (3)$$

Performance Weight of Widgets and Tasks

In some aspects, performance monitor 234 may collect or receive real time performance data and statistics information about the widgets (e.g., visual elements) of the UI. Performance monitor 234 may provide or transmit 235 the alerts, kpi, performance statistics, UI activities, or other similar data about the usage and performance of browser 202 and cloud/enterprise 204 to a stats engine 252 for further processing. Stats engine 252 may, for example, be implemented by cloud/enterprise 204 and may be configured to transmit 239 the usage and performance data to database 240 for storage and later use. Stats engine 252 may also be configured to receive any of the above mentioned data stored in database 240 for further analysis.

In some aspects, for example, stats engine 252 may be configured to analyze the alerts, kpi, performance status, UI activities, or other data received from performance monitor 234, databases 240, or from other sources, to determine performance weights of tasks 216 and widgets 212 or perform other performance related analysis of the received data. For example, stats engine 252 may collect metrics for each scenario step, e.g., response time, CPU usage, network usage, etc., from performance monitor 234 and database 240 and may aggregate the metrics along time.

In some aspects, the performance data of the widgets 212 may also be analyzed by the stats engine 252 to assign a relative performance weight to each widget.

There may be several ways to measure the performance weight of a widget including, for example, response time for the server to respond to the UI, elapsed time to complete an operation, roundtrip time of the API calls, central processing unit (CPU) time for the machine running the UI, CPU time for the systems supporting the UI, etc.

In a non-limiting example, the performance weight of a widget PW[n] may be considered as a linear function Fln[cpu-time] of the cloud/enterprise 204's CPU time according to equation (4) below:

$$PW[n]=Fln(cpu\text{-time}) \quad (4)$$

In the example of equation (4), the weight of a widget may be associated to what is happening in the internal system of the application. For example, the weight may be a linear function of the CPU where, if the CPU usage increases, the weight of the widget may also increase. In some aspects, for example, a first widget may run on the browser of the client and may not impact the CPU of the system backend, while other widgets that require computation on the backend side may have increased CPU usage resulting in increased weights as compared to the first widget.

As another example, a performance weight PTask[n] may be assigned to each single task 216 as the sum of the weight of its comprising widgets 212 $\Sigma PW[an]$, for example, according to equation (5) below where $\Sigma PW[an]$ represents a summation of the performance weight of each widget of the UI:

$$PTask[n]=\Sigma PW[an] \quad (5)$$

The performance weights of all of the tasks targeted to the same user's goal may be compared to find an optimal task OptTask[n] having the minimal performance requirement according to equation (6) below. In equation (6), the task, Task[n], having a performance weight, PTask[n], is determined as the task having the minimum performance weight of the performance weight PTask[i] of all tasks, Task[i], found in the set of equivalent tasks, SGTasks[m], that have the same user goal.

$$\text{OptTask}[n]=\text{Task}[n] \text{ where } (PTask[n] \min PTask[i] \text{ with } Task[i] \in SGTasks[m]) \quad (6)$$

In some aspects, a similar calculation may be performed to find the optimal equivalent tasks in each class of users OptClassTask[n], for example, according to equation (7) below where the set of tasks, Task[i], are selected from the intersection of the set of equivalent tasks, SGTasks[m], and the set of class tasks, ClassTasks[m]:

$$\text{OptClassTask}[n]=\text{Task}[n] \text{ where } (PTask[n] \min PTask[i] \text{ with } Task[i] \in ClassTasks[m] \cap SGTasks[m]) \quad (7)$$

Equivalent Widgets

In some aspects, widgets included in a UI may have multiple implementations to serve different cases that each require a different allocation of computing resources. For example, a simplified version of a widget may offer fewer capabilities by minimizing the numbers of service calls required by the widget. This simplified version of the widget may have a reduced performance weight as compared to a full version of the widget. As an example, a full version of a widget may include a dashboard containing a histogram and pie-charts while a simplified version of the same widget may include a single simplified chart with only the main characteristics presented.

In some aspects, a set of equivalent widgets EqW[n] may be considered as a group of visual elements W[a1], W[a2], . . . W[an] that offer the same core capabilities but have different levels of usability, for example, as shown by equation (8) below:

$$EqW[n]=\{W[a1],W[a2], \ldots W[an]\} \quad (8)$$

In some aspects, an optimal widget OptW[n] may be defined based on performance weights of the widgets where, for example, the widget W[n] that has a minimum performance weight PW[n] of all widgets W[i] in the set of equivalent widgets EqW[m] may be the optimal widget OptW[n], for example, according to equation (9) below:

$$\text{Opt}W[n]=W[n] \text{ where } (PW[n] \min PW[i] \text{ with } W[i] \in EqW[m]) \quad (9)$$

In some aspects, the an overall weight of a widget may be determined based on both performance weight and weight cost and the optimal widget OptW[n] may be determined based on the overall weight instead of just base on performance weight.

Relevant Widgets

While a task may include the use of widgets in the UI, not all of the widgets available in the UI are mandatory elements of the task. For example, some widgets may simply provide informational data to assist the user in accomplishing the task, others widgets may support optional operations, etc. Because of this it may be important to determine whether a particular widget is relevant or necessary to the performance of the task.

For example, the users' historical interaction with the widgets in the UI, as stored for example in database 240, may be analyzed, e.g., by stats engine 252, to determine which widgets and which capabilities of a widget are necessary to perform the target task. In some aspects, for example, a designer of the UI may define the weight and importance of each widget and which tasks each widget is involved in. In some aspects, the system may learn the minimal steps necessary to achieve a task, for example, using machine learning.

In some aspects, for example, the analysis may also rely on the user preferences to correct any potential errors by the algorithm. For example, the system may learn when the user receives an error using the UI and may learn which widgets have been used by another user that is able to accomplish the same task based on the other user's preferences. The algorithm may suggest a different or reduced widget to the user that is receiving the error based on this learning and in this way a modification of the UI may be realized where less degradation is introduced into the system.

Based on the analysis of historical interactions of users with the UI, a minimal set of widgets that are required to perform a task may be determined. For example, a wizard to open a problem ticket in normal condition may display two steps. For example the first step may include presenting a search panel on the UI that is used by the user to search for a similar problem in a knowledge base. The second step may include presenting an open ticket panel that is used by the user to open a ticket based on the search and to assign the ticket to a responsible user or group for consideration, e.g., a member of the IT department. During a performance degradation, the wizard may be reduced to only presenting the open ticket panel and may not present the search panel to the user. In some aspects, the search panel may alternatively be presented but temporarily disabled, e.g., greyed our or in some other form of disablement. In this aspect, for example, the user may re-enable the search panel if necessary by activating it, for example, as described below.

In some aspects, the relevance of a widget may also be determined based the weight cost of the widget where, for example, a widget with a higher weight cost may be deemed more relevant than a widget with a lower weight cost.

By applying these determinations, for example, using machine learning libraries 254, analytics libraries 256, and cognitive libraries 258 stored in cloud/enterprise 204, stats engine 252 may determine optimal widgets for a particular task, equivalent widgets for the particular task, or other similar correspondences between widgets.

Performance Optimization of UI

In some aspects, stats engine 252 may transmit stats 253 and alerts to a UI optimizer 260 to trigger 262 a modification of the UI when a current or future degradation in performance of the UI is detected, for example, performance of the UI has degraded or fallen below a threshold amount, performance of the UI is degrading or decreasing faster than a threshold rate, etc.

In response to receiving performance alerts from stats engine 252, UI optimizer 260 may modify 262 the UI to reduce the required resources in an attempt to improve or maintain performance of the UI. The goal of the modification may be to maintain a sufficient amount of capability in the UI so that the user may still be able to accomplish the task while minimizing the impact of the modification on the usability of the UI, for example, by using profiling and preferences data for the user.

In some aspects, the modification 262 may include disabling a widget in the UI. In some aspects, a disabled widget may be removed from display in the UI. In some aspects, a disabled widget may still be illustrated in the UI but its underlying features, service calls, and corresponding API's may not be executed or activated. In some aspects, only a portion of the widget's functionality may be disabled, e.g., some but not all of the services may be disabled. In this manner, resources associated with the disabled widget or widget function are not allocated and the overall resource usage of the UI may be reduced.

In some aspects, the user may decide to enable a disabled widget while performing a task, for example, by activating the disabled widget or disabled portion of the widget. The activation of a disabled widget may be transmitted 264 to performance monitor 234 or UI optimizer 260 and provided to stats engine 252 for addition to the user's preferences 244. This update to the user's preferences may be used to overwrite future algorithm modification actions for that user, for example, based on the user's activity, e.g., by not disabling that widget when the user is performing the same task in the future.

Activation of a disabled widget by a user may also cause the execution of the corresponding service call, API, etc. thereby allocating additional resources to the users UI. In some aspects, once the widget has been enabled, it may stay enabled until the user has completed the task.

An example sequence of actions performed by the UI optimizer 260 when the UI optimizer 260 receives a performance alert from stats engine 252 may be summarized as follows.

UI optimizer 260 may receive and identify user data including, for example, user identity, tasks in execution, tasks with the same goal, profiling classes for the user, a widget's relevance in a task, tasks and performance weights of the tasks, widgets and performance weights of the widgets, weight costs, groups of equivalent widgets, and optimal tasks by classes. For example, the user data may be received 253 from stats engine 252.

In some aspects, UI optimizer 260 may replace the current task with an equivalent task that has a lower performance weight, weight cost, or combined weight, etc., that achieves the same user goal. For example, the equivalent task may be extracted from the list of the optimal tasks OptClassTask[n] calculated for the classes of the user with reference, for example, to equation (7).

The task with a minimal performance weight MinOptClassTask[n] may be determined according to equation (10) below:

$$\text{MinOptClassTask}[n] = \text{Task}[n] \text{ where } (P\text{Task}[n] \text{ min } P\text{Task}[i] \text{ with Task}[i] \in \text{OptClassTask}[m])) \qquad (10)$$

The UI may be modified with the task having a reduced performance weight, for example, according to equation (10) where, for example, the UI may be modified such that the current task is replaced with the task that has reduced resource allocation requirements.

An example modification may include replacing a dashboard of the UI with a simplified mini-dashboard that includes simplified or fewer SQL queries running on the backend than the dashboard and that consume less resources.

Another example modification may include replacing a rich text editor of the UI that has a large number of functions and utility with a simple text editor that provides only basic functions and utility, thereby reducing bandwidth and resource consumption.

Another example modification may include replacing a full table with a paged table that only presents a few rows at a time, for example, using infinite scrolling or click to load mechanisms to load more elements which reduced turn-around time with the server for loading the table data.

Another example modification may include periodically analyzing user preference data and the manner in which users interact with the UI using artificial intelligence or machine learning and presenting a wizard, e.g., an instructional presentation by UI 210, to the user showing alternative methods to achieve a goal using less resource intensive widgets and tasks.

In some aspects, if the performance alert from the stats engine 252 persists, for example, the modification of the UI to use of the task having reduced performance weight does not rectify the performance degradation in the UI as sensed by performance monitor 234, the modification may be performed at the widget level by substituting current widgets W[n] with equivalent and less performance expensive ones OptW[n], for example, based on equations (8) and (9). In some aspects, the initial modification of the UI may alternative be performed at the widget level without first modifying the UI at the task level. In some aspects, modifying the UI at the task level may be subsequently performed if the degradation persists after modifying the UI at the widget level. In some aspects, a combination of modifications of the UI at both the task and widget levels may be performed in any order, for example, a task modification may be followed by a widget modification which may then be followed by yet another task or widget modification until the degradation no longer persists or no further modifications can be taken.

In some aspects, if the performance degradation persists after modifications of the UI at the widget level, the task level, or both, the UI optimizer 260 may disable widgets that are considered to be optional to the task, taking into account the user's preferences, for example, based on the determination of which widgets are or are not relevant as set forth above. As mentioned above, in some aspects, a disabled widget may be re-enabled in response to user activation of that widget.

In some aspects, if the performance degradation continues to persist after any of the above attempts to modify the UI, browser 202 may request that the user try to perform the task again at a later time. For example, if the communication connection between the browser 202 and cloud/enterprise 204 is compromised, no modification of the UI may be able to recover from the performance degradation due to the lost connection. As another example, in the event of an attack on cloud/enterprise, such as, for example, a distributed denial of service (DDOS) attack, no modification of the UI may be able overcome the excessive load on cloud/enterprise 204 caused by such an attack.

In some aspects, the modifications to the UI may be performed automatically by system architecture 200 without user input. For example, the performance of the browser 202 and cloud/enterprise may be monitored by performance monitor 234 and stats engine 252 and UI optimizer 260 may automatically perform the modification of a user's user interface without any further input from a user, administrator or other entity.

Prediction of Performance Degradation

Stats engine 252 monitors the performance trends of the browser 202 and cloud/enterprise 204 including UI 210, widgets 212, pages 214, tasks 216, APIs 220-224, and servers 226 to detect performance issues. As mentioned above, stats engine 252 may determine the performance weight of each widget and task at a given point in time, for example as described above with respect to equations (1)-(5). Stats engine 252 may also determine which users are logged in and what widgets 212 or tasks 216 they are executing, for example, based on data received from performance monitor 234 or UI optimizer 260.

When a performance degradation occurs, stats engine 252 may evaluate the classes of users 242 that are involved or affected by the degradation, the current tasks 216 that are involved or affected by the degradation involved, the performance weight as a sum of the parts (e.g., widgets 212), and other similar data, for each executing task 216.

In some aspects, the evaluated data may be fed as inputs into a machine learning or prediction algorithm that is configured to generate a machine learning model for predicting upcoming potential performance issues. For example, the machine learning algorithm may be trained by processing data and activities associated with the use of widgets in the UI by different users to perform a variety of tasks and may learn which usage of widgets successfully accomplish each task and which usage of widgets result in an error scenario. The generated machine learning model may be used to analyze data about the use of widgets as it is collected, e.g., by performance monitor 234, to output a determination of which widgets should be used in which order to successfully accomplish a particular task without resulting in an error scenario.

Additional Aspects

In some aspects, UI Optimizer 260 may identify the ability of the user to complete a task using fewer resources than other users that are attempting to complete the same or other tasks, e.g., based on performance weights, weight costs, or any other data generated by stats engine 252 or from database 240. UI optimizer 260 may reward the user by assigning the user reward points to accept a UI with lower resource usage to complete the task. For example users that need to produce reports from an application may receive more points if they will use a batch-at-night feature instead of the batch now feature, since reporting may be a resource intensive task and the cloud/enterprise 204 may often see lower load levels at night.

In some aspects, users may be profiled into clusters or groups and policies may be applied to the UI optimizer 260 to decide whether to provide a customized UI page. In some aspects, these policies may be determined based on the ability of certain sets of users to accomplish their tasks using the less expensive paths. For example, if a cluster or group of users having a role such as the Viewer role may perform a task using a less expensive widget than a cluster or group of users having a role such as the Admin role, the users having the role Viewer may be limited by a policy to only using the less expensive widget at times when the load on the cloud/enterprise is high.

Figure 4:
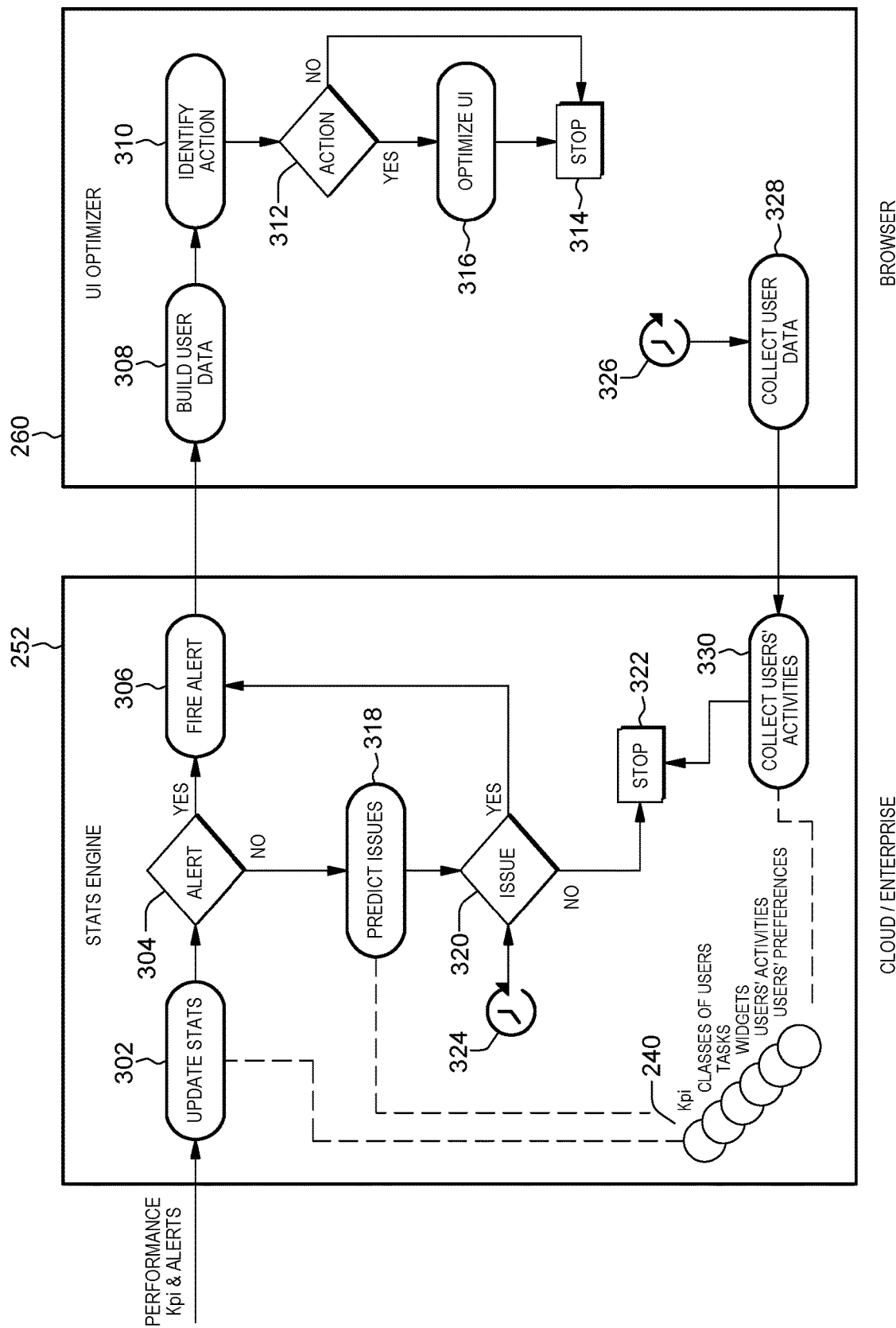
FIG. 4 is a flow chart of a method for modifying a user interface in accordance with some aspects of the present disclosure.

With reference now to FIG. 4, an example algorithm for modifying a UI is illustrated.

At 302, stats engine 252 receives data including, for example, performance KPI, alerts, or other similar data on the state of browser 202 and cloud/enterprise 204, from performance monitor 234 and updates the data in database 240.

At 304, stats engine 252 analyzes the received data to determine whether to issue an alert. For example, if the performance of the browser 202 has degraded below a threshold amount, the load on cloud/server is above a threshold amount, or other performance degrading conditions are present, stats engine 252 may determine that an alert should be issued to UI optimizer 260.

In some aspects, for example, the threshold amount may be pre-determined response time to display a particular widget or set of widgets. For example, the threshold amount may be a 5 second response time to display a specific widget or set of widgets. If it takes longer than 5 seconds to display the specific widget or set of widgets, e.g., after another action by the user, the threshold has been met and modification of the UI may be required. In some aspects, the threshold amount may be based on role where, for example, if widgets are used by a user having an operator role or viewer role, the threshold amount may be a response time of 5 seconds, while if the widgets are used by a user having an administrator role the threshold amount may be 3 seconds. In some aspects, for example, the threshold amounts may be determined by analyzing the data in database 240 using machine learning.

At 306, if stats engine 252 determines that an alert should be issued, stats engine 252 may issue or "fire" an alert to UI optimizer 260.

At 308, UI optimizer 260 receives an alert and builds user data by determining what tasks are currently being performed by users, what widgets are being used, etc.

At 310, UI optimizer 260 determines or identifies an action to be taken, for example, based on the built user data. For example, UI optimizer 260 may determine that a task currently being performed by a user may be replaced with an equivalent task that meets the same goal while using fewer resources, UI optimizer 260 may determine that a widget may be replaced with an equivalent widget that may be configured to perform the required function but with less usability or resource cost, e.g., an modified widget having reduced performance weight, or other similar modifications as described above.

At 312, UI optimizer 260 determines whether or not to implement the determined or identified action, if any action was identified. For example, if no action was identified, e.g., the current task or UI already has the most efficient elements, the action performed by UI optimizer 260 in response to the alert may end at 314. For example, when the response time of a widget is above a threshold amount, an action, e.g., to modify the widget, may be executed. Alternatively, for example, when the response time is below the threshold amount, no change to the widget may be executed as performance has not degraded.

If UI optimizer 260 determines at 312 that an action should be implemented, UI optimizer 260 modifies the UI at 316, e.g., by replacing tasks, widgets, or both with modified tasks or widgets. Once a modification has been implemented in response to the alert, action performed by UI optimizer 260 in response to the alert may end at 314.

Returning back to 304, if stats engine 252 determines not to issue an alert based on the received data, stats engine 252 may analyze the data received from performance monitor 234 at 318 to predict whether the data indicates that a future issue will occur. For example, stats engine 252 may use machine learning or other similar predictive tools to make this determination. In some aspects, for example, historical execution of tasks by classes of users may be analyzed to determine whether a future degradation is imminent.

At 320, stats engine 252 determines whether an issue has been predicted by the analysis. If an issue such as a performance degradation is predicted, an alert may be issued or "fired" to UI optimizer 260 at 306 as described above. If no issue is predicted, the method may end at 322. In some aspects, the determination of whether an issue has been predicted may performed continuously or periodically, as indicated by the clock symbol 324 in FIG. 4.

In some aspects, the modification of UI 210 may be a continuous or periodic process where, for example, stats engine 252 may continuously or periodically receive data from performance monitor 234 and determine whether to issue alerts to UI optimizer 260 for action by UI optimizer 260 in modifying UI 210.

In some aspects, UI optimizer 260 may also continuously or periodically receive user activity data from UI 210, as indicated by the clock symbol 326 illustrated in FIG. 4, including, for example, what tasks a user is performing, what widgets the user is using, what functionality the user is using, or other similar data regarding the use of tasks and widgets in UI 210 by users.

At 328 UI optimizer 260 may collect the user activity data and transmit the user activity data to stats engine 252 for further analysis.

At 330, stats engine 252 receives the collected user activity data from UI optimizer 260 and may analyze the data to determine what class of users the user activity data belongs to. Stats engine 252 may store the collected user activity in databases 240, for example, as data on user activities by classes 250.

Figure 5:
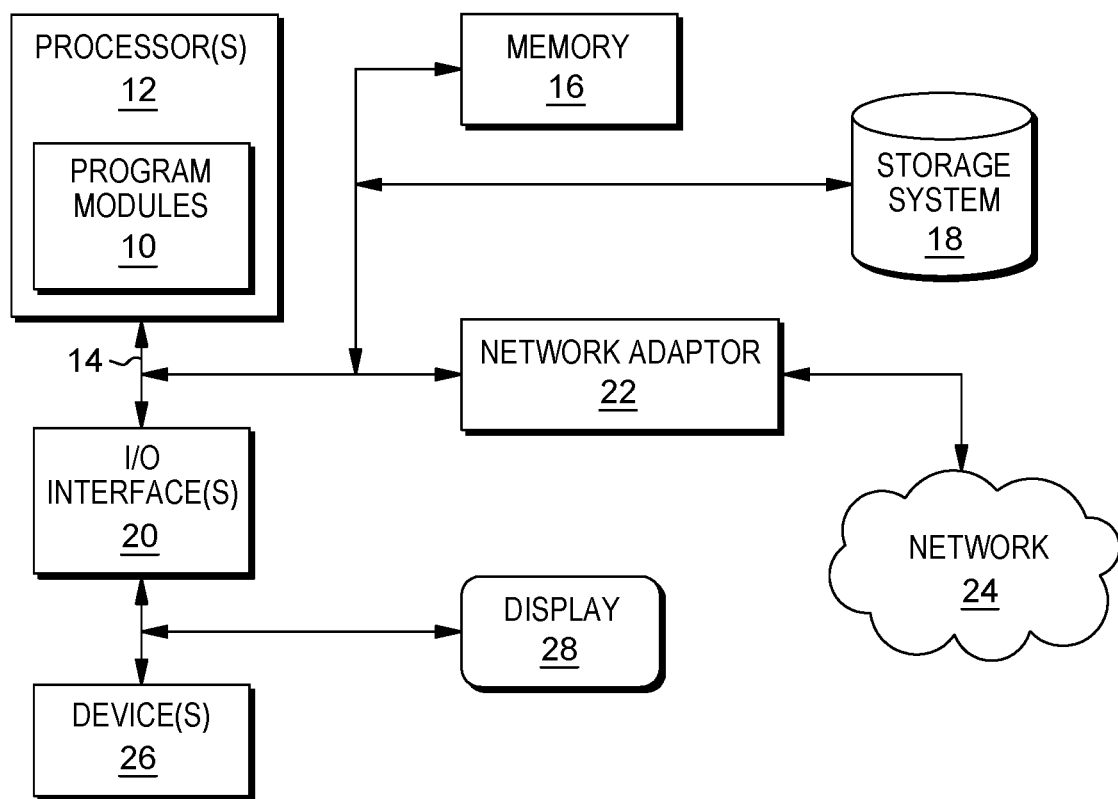
FIG. 5 is an exemplary block diagram of a computer system in which processes involved in the system, method, and computer program product described herein may be implemented.

FIG. 5 illustrates a schematic of an example computer or processing system that may implement any portion of system 100, computing device 110, server 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
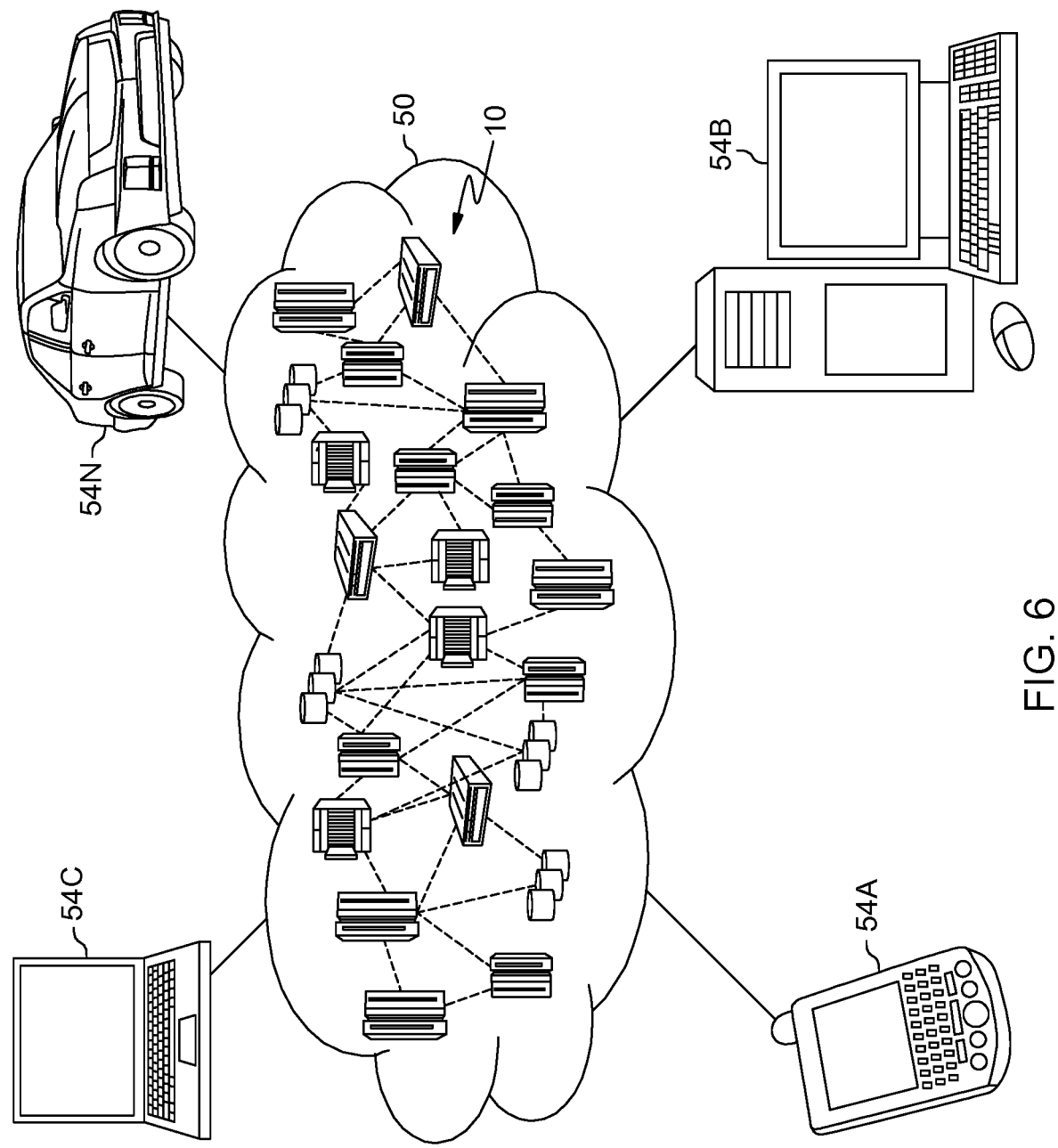
FIG. 6 depicts a cloud computing environment according to an embodiment of the present invention.

Referring now to FIG. 6 illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
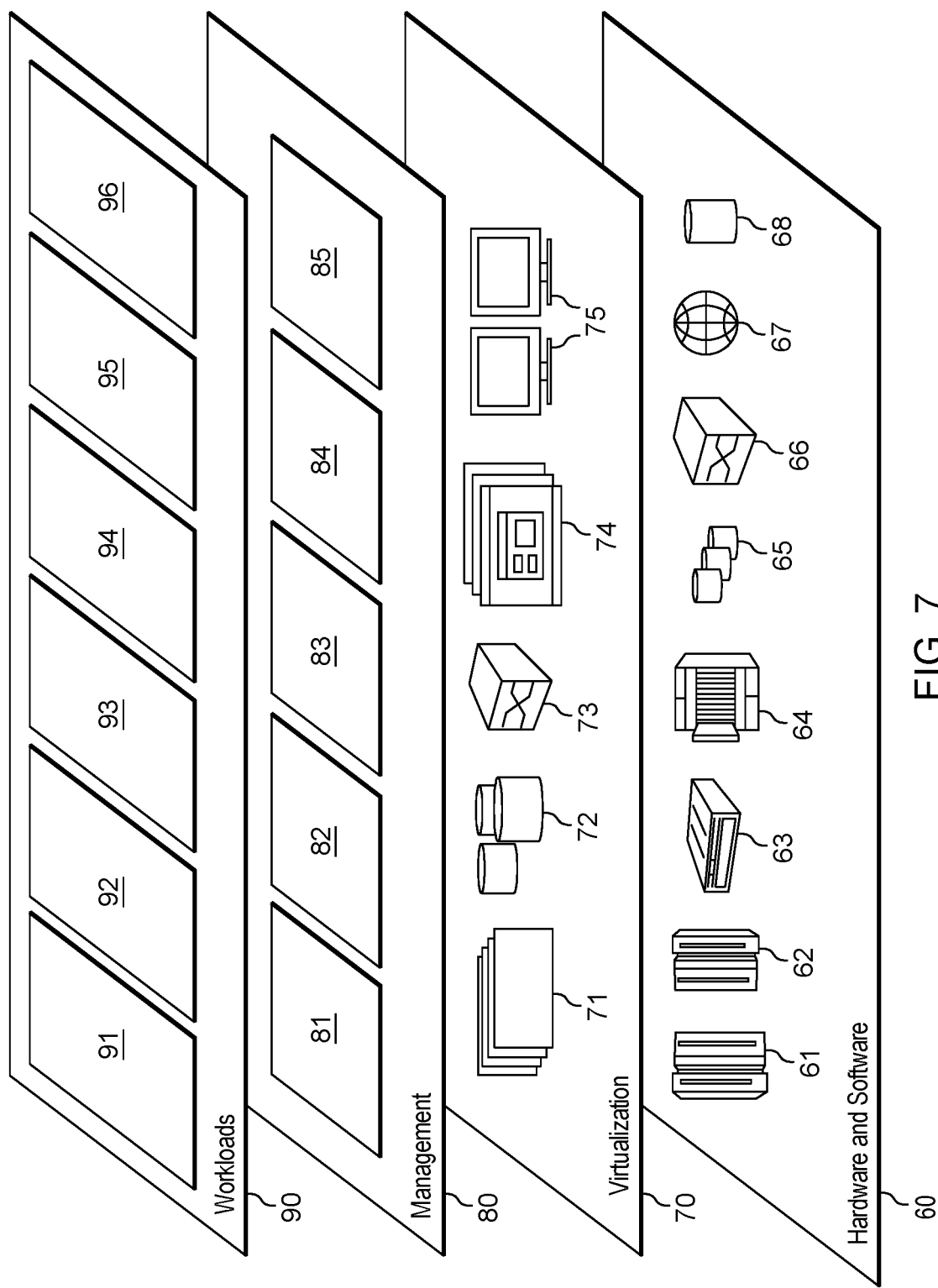
FIG. 7 depicts abstraction model layers according to an embodiment of the present invention.

Referring now to FIG. 7, a set of functional abstraction layers provided by cloud computing environment 50 (FIG. 1) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and execution APIs 96.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:

presenting a user interface (UI) to a user, the user associated with a class of users, the user interface including a first plurality of elements usable together by the user to perform a task to achieve a target goal, a performance of the task requiring an allocation of a first amount of resources of a server, the first amount of resources corresponding to the resources of the server required by the first plurality of elements to perform the task;

receiving performance data associated with the user interface, and determining a performance weight of the first plurality of elements based on said performance data;

determining based on the performance weight that a performance of the user interface has degraded below a threshold amount;

in response to determining that the performance of the user interface has degraded below a threshold amount: determining based on said target goal, a set of equivalent tasks for achieving said target goal, said set of equivalent tasks determined as an intersection of a set of alternate tasks for achieving the target goal and a set of different tasks associated with the user's class to achieve said target goal;

comparing a performance weight of all of the equivalent tasks from said set of equivalent tasks for achieving the target goal;

selecting an optimal equivalent task having a minimum performance weight from the set of equivalent tasks, a performance of the optimal equivalent task requiring an allocation of a second amount of resources of the server, the second amount of resources corresponding to the resources of the server required by a second plurality of elements to perform the optimal equivalent task, the second amount of resources being different than the first amount of resources; and replacing the task with the optimal equivalent task to reduce the required amount of resources that are allocated by the server to the user interface.

2. The method of claim 1, wherein the first and second elements are widgets, each widget having an associated performance weight, said optimal equivalent task comprising a minimum performance weight is a minimum weight of a sum of the weights of all widgets for performing the optimal equivalent task.

3. The method of claim 2, wherein an overall performance weight of a widget is determined based on both a performance weight of the widget, a weight cost of the widget, or both a performance weight and weight cost of the widget.

4. The method of claim 3, wherein a performance weight of a widget is a linear function of an amount of a central processing unit's usage time for running and supporting the user interface.

5. The method of claim 3, wherein to determine a weight cost of a widget, said method further comprises:

searching a ranking table listing widgets and an associated weight cost of each widget, a weight cost for a widget determined according to one or more of the user class, a user profile or a user's activity pattern for accomplishing a task using said widget.

6. The method of claim 2, wherein said performance data is received from a performance monitor for obtaining statistics information about a widget, said statistics information comprising alerts, key performance indicators, a performance status and collected metrics associated with user interface activities and aggregated in time.

7. The method of claim 2, wherein a set of equivalent widgets comprises a group of visual elements having a same capability for achieving the task goal, but a different level of usability.

8. The method of claim 2, further comprising: determining whether a widget is relevant to the performing of said task, said determining comprising:
 analyzing a users' historical interaction with the widgets in the UI to determine which widget and which capabilities of the widget are necessary to perform the task, and
 implementing machine learning to learn a minimal number of steps for a widget to achieve the task.

9. A non-transitory computer readable storage medium comprising instructions that, when executed by at least one processor comprising hardware, configures the at least one hardware processor to:
 present a user interface (UI) to a user, the user associated with a class of users, the user interface including a first plurality of elements usable together by the user to perform a task to achieve a target goal, a performance of the task requiring an allocation of a first amount of resources of a server, the first amount of resources corresponding to the resources of the server required by the first plurality of elements to perform the task;
 receive performance data associated with the user interface, and determine a performance weight of the first plurality of elements based on said performance data;
 determine based on the performance weight that a performance of the user interface has degraded below a threshold amount; and
 in response to determining that the performance of the user interface has degraded below a threshold amount: said instructions further configuring the at least one hardware processor to determine based on said target goal, a set of equivalent tasks for achieving said target goal, said set of equivalent tasks determined as an intersection of a set of alternate tasks for achieving the target goal and a set of different tasks associated with the user's class to achieve said target goal;
 compare a performance weight of all of the equivalent tasks from said set of equivalent tasks for achieving the target goal;
 select an optimal equivalent task having a minimum performance weight from the set of equivalent tasks, a performance of the optimal equivalent task requiring an allocation of a second amount of resources of the server, the second amount of resources corresponding to the resources of the server required by a second plurality of elements to perform the optimal equivalent task, the second amount of resources being different than the first amount of resources; and
 replace the task with the optimal equivalent task to reduce the required amount of resources that are allocated by the server to the user interface.

10. The non-transitory computer readable storage medium of claim 9, wherein the first and second elements are widgets, each widget having an associated performance weight, said optimal equivalent task comprising a minimum performance weight is a minimum weight of a sum of the weights of all widgets for performing the optimal equivalent task.

11. The non-transitory computer readable storage medium of claim 10, wherein an overall performance weight of a widget is determined based on both a performance weight of the widget, a weight cost of the widget, or both a performance weight and weight cost of the widget.

12. The non-transitory computer readable storage medium of claim 10, wherein a performance weight of a widget is a linear function of an amount of a central processing unit's usage time for running and supporting the user interface.

13. The non-transitory computer readable storage medium of claim 10, wherein to determine a weight cost of a widget, said instructions further configuring the at least one hardware processor to:
 search a ranking table listing widgets and an associated weight cost of each widget, a weight cost for a widget determined according to one or more of the user class, a user profile or a user's activity pattern for accomplishing a task using said widget.

14. The non-transitory computer readable storage medium of claim 10, wherein said performance data is received from a performance monitor for obtaining statistics information about a widget, said statistics information comprising alerts, key performance indicators, a performance status and collected metrics associated with user interface activities and aggregated in time.

15. The non-transitory computer readable storage medium of claim 10, wherein a set of equivalent widgets comprises: a group of visual elements having a same capability for achieving the target goal, but a different level of usability.

16. The non-transitory computer readable storage medium of claim 10, wherein said instructions further configure the at least one hardware processor to:
 determine whether a widget is relevant to the performing of said task, said determining comprising:
 analyzing a users' historical interaction with the widgets in the UI to determine which widget and which capabilities of the widget are necessary to perform the task, and
 implementing machine learning to learn a minimal number of steps for a widget to achieve the task.

17. A system comprising at least one processor comprising hardware, the at least one processor configured to:
 present a user interface to a user, the user associated with a class of users, the user interface including a first plurality of elements usable together by the user to perform a task to achieve a target goal, a performance of the task requiring an allocation of a first amount of resources of a server, the first amount of resources corresponding to the resources of the server required by the first plurality of elements to perform the task;
 receive performance data associated with the user interface, and determine a performance weight of the first plurality of elements based on said performance data;
 determine based on the performance weight that a performance of the user interface has degraded below a threshold amount; and
 in response to determining that the performance of the user interface has degraded below a threshold amount: said instructions further configuring the at least one hardware processor to determine based on said target goal, a set of equivalent tasks for achieving said target goal, said set of equivalent tasks determined as an intersection of a set of alternate tasks for achieving the target goal and a set of different tasks associated with the user's class to achieve said target goal;
 compare a performance weight of all of the equivalent tasks from said set of equivalent tasks for achieving the target goal;
 select an optimal equivalent task having a minimum performance weight from the set of equivalent tasks, a performance of the optimal equivalent task requiring an allocation of a second amount of resources of the server, the second amount of resources corresponding to the resources of the server required by a second plurality of elements to perform the optimal equivalent task, the second amount of resources being different than the first amount of resources; and replace the task with the optimal equivalent task to reduce the required amount of resources that are allocated by the server to the user interface.

18. The system of claim 17, wherein the first and second elements are widgets, each widget having an associated performance weight, said optimal equivalent task comprising a minimum performance weight is a minimum weight of a sum of the weights of all widgets for performing the optimal equivalent task.

19. The system of claim 18, wherein an overall performance weight of a widget is determined based on both a performance weight of the widget, a weight cost of the widget, or both a performance weight and weight cost of the widget, a performance weight of a widget is a linear function of an amount of a central processing unit's usage time for running and supporting the user interface.

20. The system of claim 18, wherein to determine a weight cost of a widget, said at least one processor is further configured to:

search a ranking table listing widgets and an associated weight cost of each widget, a weight cost for a widget determined according to one or more of the user class, a user profile or a user's activity pattern for accomplishing a task using said widget.

* * * * *